March 18, 1924.  G. W. SHAW  1,487,613
ROUTE OR GUIDE MAP
Filed March 21, 1923   2 Sheets-Sheet 1

Patented Mar. 18, 1924.

1,487,613

UNITED STATES PATENT OFFICE.

GEORGE W. SHAW, OF PHILADELPHIA, PENNSYLVANIA.

ROUTE OR GUIDE MAP.

Application filed March 21, 1923. Serial No. 626,460.

*To all whom it may concern:*

Be it known that I, GEORGE W. SHAW, a citizen of the United States, residing at Philadelphia, in the county of Philadelphia and State of Pennsylvania, have invented new and useful Improvements in a Route or Guide Map, of which the following is a specification.

My invention relates to new and useful improvements in a route or guide map, and has for its object the provision of a map, chart or plan having the routes of trolleys, railroads, steamships, highways, tours, detours, interurban lines or any other routes delineated thereon by means of differently colored lines, either continuous or broken, each color having a specific numerical digit value so that they may be used singly or in different combinations to represent any desired number by which a route is designated.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figure 1:
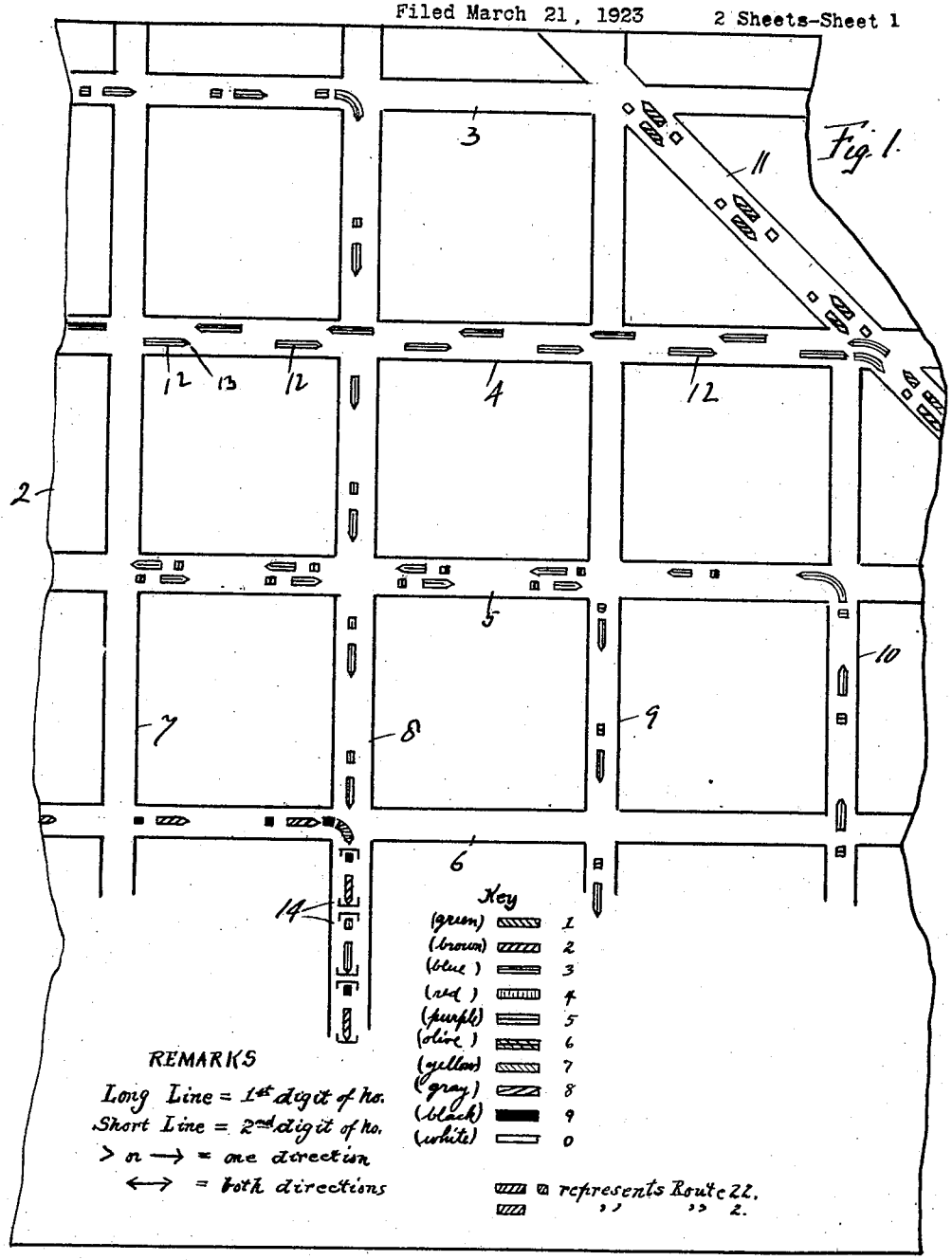
Figure 2:
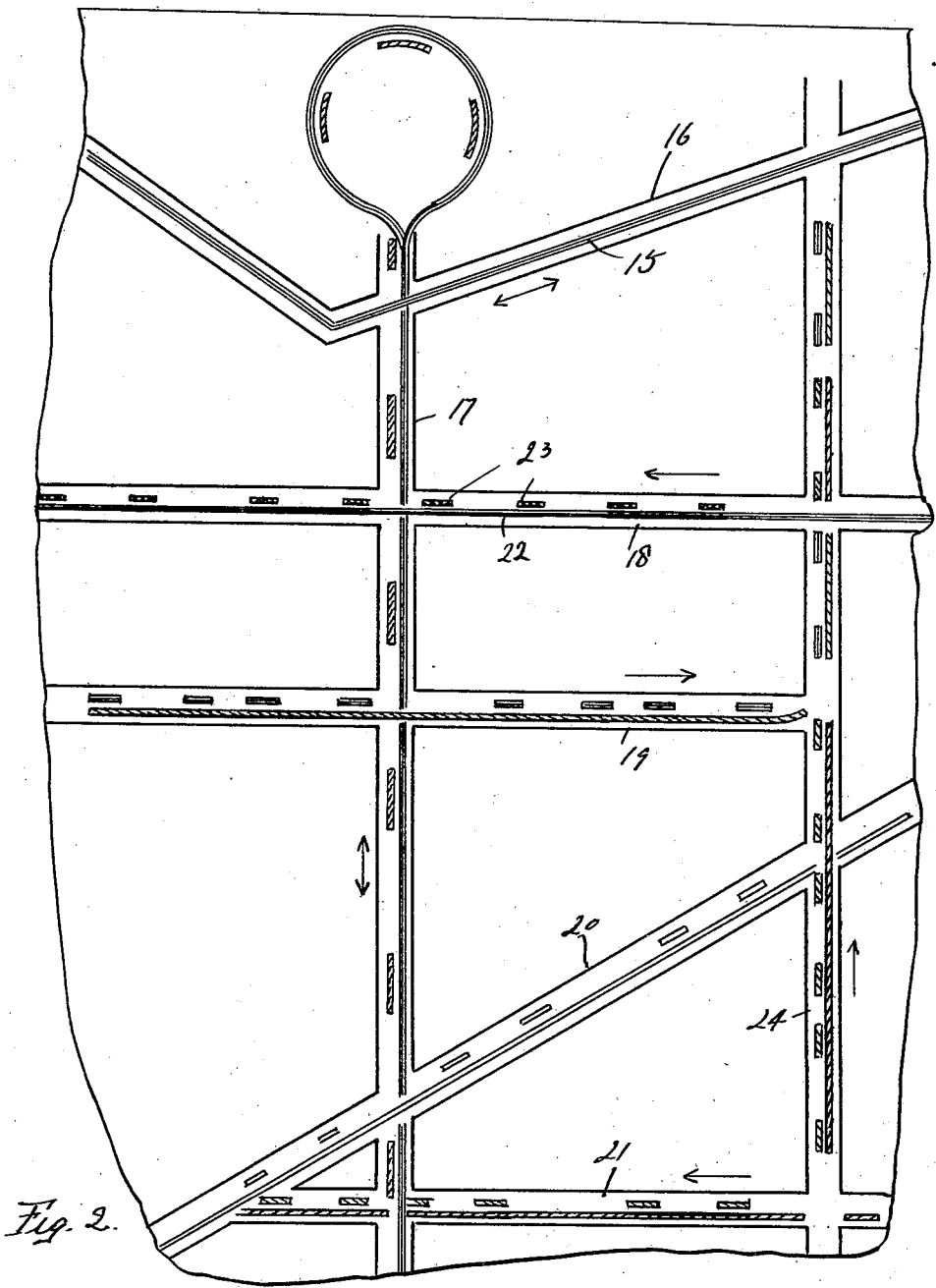

Fig. 1, is a fragmentary view of a map illustrating one embodiment of my invention and representing a section of city streets to show the routes of certain trolley or street car lines; and Fig. 2, is a similar view of a different map, chart or plan illustrating another or modified embodiment of the invention.

In carrying out my invention as embodied in Fig. 1, 2 represents a map, chart or plan having routes or lines of travel, such as streets, railways, waterways, highways or the like delineated thereon, such routes or lines of travel in this instance being shown as streets and designated by the numerals 3, 4, 5, 6, 7, 8, 9, 10 and 11. On certain of these lines of travel or streets are shown trolley or car routes by means of colored lines located at different points along the respective routes, said lines being herein shown conventionally as rectangular geometrical figures but it is to be understood that in actual practice these blocks or figures are merely lines although they may be of any desirable breadth.

As shown in the key to the numerical digit value of the color scale the color value of the digit 1 is green, that of digit 2 is brown, that of digit 3 is blue, that of digit 4 is red, that of digit 5 is purple, that of digit 6 is olive, that of digit 7 is yellow, that of digit 8 is gray, that of digit 9 is black and the naught or cipher is white. It is to be particularly understood that by the reference to color herein is meant to also include shades, tints or tones of the different colors.

As herein shown a car route designated by a single digit numeral such as that shown running on the street represented by the numeral 4 is illustrated by a single short line 12 located at different points throughout the entire route and since the color of this line is blue it indicates that which is route 3 and by following out this line the ultimate destination of a car thereon is immediately indicated as well as showing the different streets which it traverses and in order to definitely designate the direction of travel of such a car an arrow may be employed which is placed at the head of the colored line as shown at 13 or it may be arranged at any other convenient point. Where car lines or routes are designated by a plural digit number a number of differently colored lines of different length may be employed and these lines may be arranged in endwise alignment, for instance the street car running on the streets designated by the numerals 5, 9 and 10, are represented by lines colored to blue and red and since the longer line represents the first digit of the number and the shorter line the second digit it is apparent that this car route is numbered 34 and due to the arrows it may be readily ascertained that this car line runs in two opposite directions on a portion of the street represented by the numeral 5 while running in only one direction on the streets represented by the numerals 9 and 10 and on one street in a direction opposite to that on another.

Where a car route as that shown running on the streets represented by the numerals 3 and 8 has its route number made up of two like digits the length of the different lines making up the numerals would be immaterial and in this particular route both digits are designated by the color blue and is therefore 33, and where the number of car lines run over the same route as that one turning in from the street designated by the numeral 6 to street 8 on which the aforementioned route 33 is running then the lines representing the numerals should alternate and if found desirable each set of lines may be separated from adjacent sets of lines by brackets 14 or their equivalent. The color of the lines making up the route number for the car line running on streets 6 and 8 being brown and black indicates that the route is numbered 29 so that on the lower portion of street 8 herein shows that two lines run thereon throughout a portion of such street.

The colors of the double track line on street 11 are brown and white indicating that this is route 20.

By this arrangement a person desiring to travel from the point of intersection of streets 3 and 7 to the point of intersection of the streets 6 and 8 may by comparing the colors at these points or following out the entire route, because of the colors, readily ascertain that it is necessary to use route 11. This system may be carried out in all classes of routes or travel lines by designating each route or line by some number, the digits of which have specific color values.

In addition to the key for indicating the color values of the different numerical digits a list of remarks may be included on the map, chart or plan to enlighten the user as to the meaning of certain marks or as directions for using the guide.

In Fig. 2, the same idea is carried out by means of a slightly different arrangement of the colored lines wherein a single digit is represented by a continuous unbroken line throughout an entire route as indicated at 15 on the street 16, said colored line being shown as blue and therefore representing the numeral 3 according to the key shown in Fig. 1 which is carried out in Fig. 2.

Where the route designation comprises a plurality of digits such as for instance that shown on streets 17, 18, 19, 20 and 21, the first digit of the numeral comprises one continuous or unbroken line 22 and shorter lines 23 beside the first line in parallelism therewith will designate the second digit of the numeral and therefore the car route or street 18 is 37 because of the colors of said lines. In a like manner the route numbers of the car lines on the other streets may be readily ascertained by reference to the key shown in Fig. 1. Where, as shown on street 24 a single car line runs on a portion thereof and other or a number of car lines run on another portion of such street, the first digit of the number of the route running alone on said street may be a continuous or unbroken line to the point where another car line enters said street after which the first digit of the numbers of these car routes must be shorter and in alternate relation to each other but relatively longer than the lines designating the second or other digits of the number which are in parallel and close proximity thereto.

Of course I do not wish to be limited to the exact details of construction as herein shown as these may be varied within the limits of the appended claims without departing from the spirit of my invention.

Having thus fully described my invention, what I claim as new and useful is:—

1. A guide system comprising a map, representing the routes of travel each designated by a numeral and long and short colored lines having numerical digit values arranged in numerical sequence on said routes to indicate each respective route number.

2. A guide system comprising a map, representing the routes of travel each designated by a numeral and long and short colored lines having numerical digit values located in endwise alignment on the routes to indicate their respective route numbers, the longer line denoting a primary digit and the shorter line a secondary digit.

3. A guide system comprising a map, representing the routes of travel each designated by a numeral and long and short colored lines having numerical digit values located in parallelism on the routes to indicate their respective numbers, the longer line denoting the primary digit and the the shorter line a secondary digit.

In testimony whereof, I have hereunto affixed my signature.

GEORGE W. SHAW.